US010338800B2

(12) United States Patent
Rivers et al.

(10) Patent No.: US 10,338,800 B2
(45) Date of Patent: Jul. 2, 2019

(54) ENHANCED PILOT DISPLAY SYSTEMS AND METHODS

(71) Applicant: FLIR Belgium BVBA, Meer (BE)

(72) Inventors: Mark Rivers, Winchester (GB); Mark Garland, Nashua, NH (US)

(73) Assignee: FLIR Belgium BVBA, Meer (BE)

( * ) Notice: Subject to any disclaimer, the term of this patent is extended or adjusted under 35 U.S.C. 154(b) by 0 days.

(21) Appl. No.: 15/011,399

(22) Filed: Jan. 29, 2016

(65) Prior Publication Data

US 2016/0162145 A1 Jun. 9, 2016

Related U.S. Application Data

(63) Continuation-in-part of application No. 14/966,998, filed on Dec. 11, 2015, and a continuation-in-part of
(Continued)

(51) Int. Cl.
*G06F 3/0486* (2013.01)
*G06F 3/01* (2006.01)
(Continued)

(52) U.S. Cl.
CPC .......... *G06F 3/0486* (2013.01); *G01C 21/00* (2013.01); *G01S 13/9307* (2013.01);
(Continued)

(58) Field of Classification Search
None
See application file for complete search history.

(56) References Cited

U.S. PATENT DOCUMENTS 2,671,206 A 3/1954 Krause
3,989,216 A 11/1976 Veatch
(Continued)

FOREIGN PATENT DOCUMENTS

EP 1148347 10/2001
EP 2626721 8/2013
(Continued)

OTHER PUBLICATIONS

2019 Revised Patent Subject Matter Eligibility Guidance—Advance Module, Example 37, pp. 53-90. Jan. 2019 (Year: 2019).*

*Primary Examiner* — Kevin P Mahne
(74) *Attorney, Agent, or Firm* — Haynes and Boone, LLP

(57) ABSTRACT

Techniques are disclosed for systems and methods to generate navigational imagery to help users pilot and/or otherwise operate mobile structures. A pilot display system includes one or more logic devices configured to communicate with various sensors, such as a ranging sensor and a speed, position, and/or orientation sensor (SPOS) mounted to a mobile structure, and one or more user interfaces, which may include one or more displays. At least one user interface is in proximity to a mobile structure and/or a user of a mobile structure and is configured to receive user input and provide user feedback with respect to a mobile structure. The logic devices are configured to render a reference icon on a display substantially statically relative to the display, to receive user selection of a target icon, and to render a target dialog substantially statically relative to the selected target icon.

20 Claims, 12 Drawing Sheets

Related U.S. Application Data application No. PCT/US2015/056786, filed on Oct. 21, 2015.

(60) Provisional application No. 62/213,577, filed on Sep. 2, 2015, provisional application No. 62/110,414, filed on Jan. 30, 2015, provisional application No. 62/091,450, filed on Dec. 12, 2014, provisional application No. 62/069,961, filed on Oct. 29, 2014.

(51) Int. Cl.

| | | |
|---|---|---|
| *G06F 3/0481* | (2013.01) | |
| *G06F 3/0484* | (2013.01) | |
| *G01S 13/93* | (2006.01) | |
| *G08G 3/02* | (2006.01) | |
| *G01C 21/00* | (2006.01) | |
| *G01S 15/93* | (2006.01) | |
| *G01S 17/93* | (2006.01) | |
| *G01S 7/41* | (2006.01) | |

(52) U.S. Cl.
CPC .......... *G06F 3/017* (2013.01); *G06F 3/04812* (2013.01); *G06F 3/04817* (2013.01); *G06F 3/04842* (2013.01); *G08G 3/02* (2013.01); *G01S 7/411* (2013.01); *G01S 7/414* (2013.01); *G01S 15/93* (2013.01); *G01S 17/93* (2013.01)

(56) References Cited

U.S. PATENT DOCUMENTS

| | | |
|---|---|---|
| 4,982,924 A | 1/1991 | Havins |
| 5,142,649 A | 8/1992 | O'donnell |
| 5,561,641 A | 10/1996 | Nishimori et al. |
| 6,050,945 A | 4/2000 | Peterson et al. |
| 6,408,248 B1 | 6/2002 | Yancey, Jr. et al. |
| 6,806,622 B1 | 10/2004 | Schmidt et al. |
| 7,542,376 B1 | 6/2009 | Thompson et al. |
| 8,260,545 B1 * | 9/2012 | Aspen ................ G01C 23/005 283/34 |
| 9,310,218 B2 * | 4/2016 | Choi ................ G01C 21/3679 |
| 2004/0158147 A1 | 8/2004 | Shifrin |
| 2008/0168398 A1 * | 7/2008 | Geelen ............. G01C 21/3655 715/854 |
| 2010/0223003 A1 * | 9/2010 | Harada ............. G01C 21/3682 701/533 |
| 2012/0014220 A1 * | 1/2012 | DePasqua ........... G01S 7/52004 367/88 |
| 2014/0010049 A1 | 1/2014 | Proctor |
| 2014/0013284 A1 | 1/2014 | Thomas et al. |
| 2014/0104100 A1 * | 4/2014 | Kubota ................... G01S 7/066 342/182 |
| 2014/0365126 A1 * | 12/2014 | Vulcano ................ G01C 21/36 701/533 |
| 2015/0025718 A1 * | 1/2015 | Miichi ................ G09B 29/007 701/21 |
| 2015/0330804 A1 * | 11/2015 | Okuda ................ G01C 21/203 701/487 |

FOREIGN PATENT DOCUMENTS

| | | |
|---|---|---|
| JP | 2012154791 | 8/2012 |
| WO | WO 2013/063515 | 5/2013 |
| WO | WO 2015/126678 | 8/2015 |

\* cited by examiner

ENHANCED PILOT DISPLAY SYSTEMS AND METHODS

CROSS-REFERENCE TO RELATED APPLICATIONS

This application claims priority to and the benefit of U.S. Provisional Patent Application No. 62/110,414 filed Jan. 30, 2015 and entitled "ENHANCED PILOT DISPLAY SYSTEMS AND METHODS", which is hereby incorporated by reference in its entirety.

This application is a continuation-in-part International Patent Application No. PCT/US2015/056786 filed Oct. 21, 2015 and entitled "PILOT DISPLAY SYSTEMS AND METHODS", which claims priority to and the benefit of U.S. Provisional Patent Application No. 62/069,961 filed Oct. 29, 2014 and entitled "PILOT DISPLAY SYSTEMS AND METHODS", and U.S. Provisional Patent Application No. 62/066,802 filed Oct. 21, 2014 and entitled "ENHANCED SONAR DISPLAY USING CW/FM PULSE OVERLAYS", all of which are hereby incorporated herein by reference in their entirety.

This application is a continuation-in-part of U.S. patent application Ser. No. 14/966,998 filed Dec. 11, 2015 and entitled "COLLISION AVOIDANCE SYSTEMS AND METHODS", which claims priority to and the benefit of U.S. Provisional Patent Application No. 62/213,577 filed Sep. 2, 2015 and entitled "COLLISION AVOIDANCE SYSTEMS AND METHODS", and U.S. Provisional Patent Application No. 62/091,450 filed Dec. 12, 2014 and entitled "COLLISION AVOIDANCE SYSTEMS AND METHODS", all of which are hereby incorporated herein by reference in their entirety.

This application is related to International Patent Application No. PCT/US2015/032304 filed May 22, 2015 and entitled "MULTICHANNEL SONAR SYSTEMS AND METHODS", which claims priority to and the benefit of U.S. Provisional Patent Application No. 62/005,838 filed May 30, 2014 and entitled "MULTICHANNEL SONAR SYSTEMS AND METHODS", all of which are hereby incorporated herein by reference in their entirety.

This application is also related to International Patent Application No. PCT/US2015/018986 filed Mar. 5, 2015 and entitled "SAILING USER INTERFACE SYSTEMS AND METHODS", which claims priority to and the benefit of U.S. Provisional Patent Application No. 61/949,864 filed Mar. 7, 2014 and entitled "SAILING USER INTERFACE SYSTEMS AND METHODS", all of which are hereby incorporated herein by reference in their entirety.

This application is also related to International Patent Application No. PCT/US2015/015279 filed Feb. 10, 2015 and entitled "MODULAR SONAR TRANSDUCER ASSEMBLY SYSTEMS AND METHODS", which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS", all of which are hereby incorporated herein by reference in their entirety.

This application is also related to International Patent Application No. PCT/US2015/047991 filed Sep. 1, 2015 and entitled "ROTATING ATTITUDE HEADING REFERENCE SYSTEMS AND METHODS", which claims priority to and the benefit of U.S. Provisional Patent Application No. 62/044,911 filed Sep. 2, 2014 and entitled "REMOTE SENSING WITH INTEGRATED ORIENTATION AND POSITION SENSORS SYSTEMS AND METHODS", U.S. Provisional Patent Application No. 62/099,090 filed Dec. 31, 2014 and entitled "ROTATING ATTITUDE HEADING REFERENCE SYSTEMS AND METHODS", and U.S. Provisional Patent Application No. 62/212,955 filed Sep. 1, 2015 and entitled "ROTATING ATTITUDE HEADING REFERENCE SYSTEMS AND METHODS", all of which are hereby incorporated herein by reference in their entirety.

TECHNICAL FIELD

One or more embodiments of the invention relate generally to marine systems and more particularly, for example, to systems and methods for providing marine display imagery.

BACKGROUND

Conventional marine systems typically include devices to detect orientation and speed of a watercraft as it traverses a body of water. Such systems often include a display configured to provide related navigational information to a user. However, marine systems are being implemented with a wide array of new devices providing new types and increased amounts of sensor data that can easily overwhelm a user and a conventional navigational display/user interface, particularly while the watercraft is being piloted near impediments to navigation and navigational aid is critical for operational safety. Thus, there is a need for an improved methodology to provide accurate and intuitive navigational information and status to a user of a mobile structure, particularly in the context of piloting a watercraft.

SUMMARY

Techniques are disclosed for systems, methods, and devices to provide navigational imagery to help users pilot and/or otherwise operate mobile structures. A pilot display system may include one or more logic devices configured to communicate with various sensors, such as a ranging sensor and a speed, position, and/or orientation sensor (SPOS) mounted to a mobile structure, and one or more user interfaces, which may include one or more displays. Each user interface may be in proximity to a mobile structure and/or a user of a mobile structure and be configured to receive user input and provide user feedback with respect to a mobile structure. The logic devices may be configured to receive at least a position of the mobile structure, to generate navigational image data based, at least in part, on the position of the mobile structure, and to render the navigational image data via at least one display of a user interface.

In various embodiments, a pilot display system may include one or more orientation sensors, position sensors, speed sensors, ranging sensors, gyroscopes, accelerometers, and/or additional sensors, actuators, controllers, user interfaces, mapping systems, Automatic Identification System (AIS) transceivers, and/or other modules mounted to or in proximity to a vehicle or mobile structure. Each component of the system may be implemented with a logic device adapted to form one or more wired and/or wireless communication links for transmitting and/or receiving sensor signals, control signals, or other signals and/or data between the various components.

In one embodiment, a system may include a logic device configured to communicate with a user interface for a mobile structure. The logic device may be configured to render a target icon and a reference icon on a display of the user interface, wherein the reference icon is associated with the mobile structure and is rendered substantially statically relative to the display; receive user selection of the target icon; and render a target dialog on the display, wherein the target dialog is rendered substantially statically relative to the selected target icon.

In another embodiment, a method may include rendering a target icon and a reference icon on a display of the user interface, wherein the reference icon is associated with the mobile structure and is rendered substantially statically relative to the display; receiving user selection of the target icon; and rendering a target dialog on the display, wherein the target dialog is rendered substantially statically relative to the selected target icon.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, navigational imagery provided by the present pilot display system can be used to help operate a mobile structure. The pilot display system may include one or more controllers, user interfaces, sonar systems, radar systems, other ranging systems, and various orientation, position, and/or speed sensors that may be configured to determine and/or provide information about the state of the mobile structure and/or mobile or stationary targets remote from the mobile structure. For example, the sensors may be mounted to or within the mobile structure (e.g., a watercraft, aircraft, motor vehicle, and/or other mobile structure), or may be integrated with a portable imaging device, a sonar system, a radar system, and/or other ranging systems associated with the mobile structure. Embodiments of the present disclosure may be configured to produce navigational imagery that are organized, uncluttered, accurate, and relatively easy to interpret by a user operating a mobile structure, particularly during time critical maneuvering of the mobile structure.

Figure 1A:
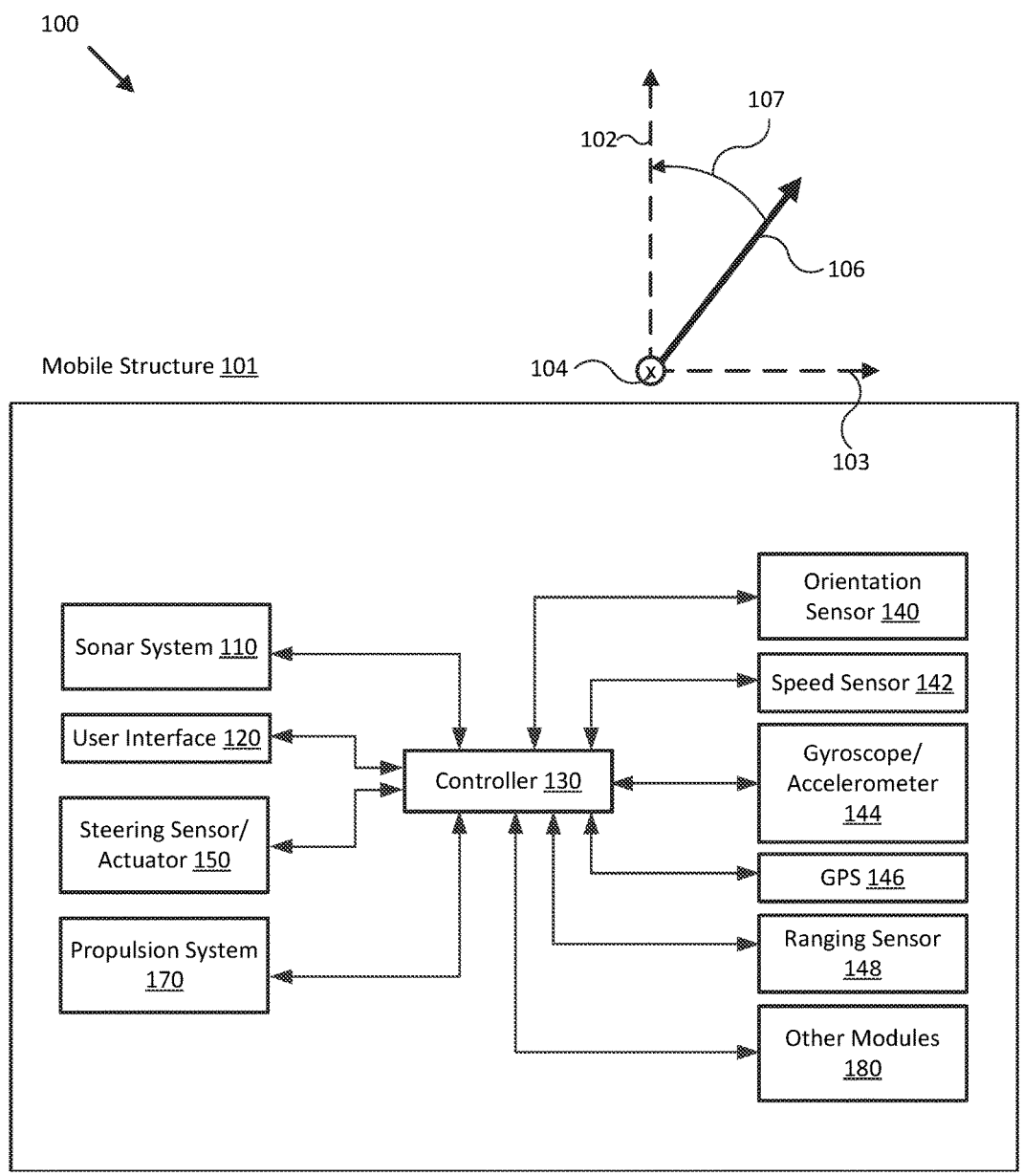
FIG. 1A illustrates a block diagram of a pilot display system in accordance with an embodiment of the disclosure.

FIG. 1A illustrates a block diagram of pilot display system 100 in accordance with an embodiment of the disclosure. In various embodiments, system 100 may be adapted to measure an orientation, a position, an acceleration, and/or a speed of mobile structure 101, sonar system 110, ranging system 148, and/or other elements of system 100. Furthermore, system 100 may be adapted to detect a target remote from mobile structure 101 using, for example, ranging sensor 148, and determine various attributes of the target. System 100 may then use these measurements/detections to render positions of mobile structure 101 and/or targets on a display (e.g., as icons on a chart or video imagery) of user interface 120 to allow a user to select rendered targets for organized and uncluttered display of additional information in respective target dialogs, which may be critical to navigation of mobile structure 101, for example. Furthermore, once selected, the target dialogs may be configured to scroll with the underlying chart so that mobile structure 101 stays on the display and only relevant target dialogs are rendered on the display. In some embodiments, system 100 may display resulting image data to a user through user interface 120, and/or use the image data and/or user input to control operation of mobile structure 101, such as controlling steering actuator 150 and/or propulsion system 170 to pilot, e.g., steer, mobile structure 101 according to a desired heading, such as heading angle 107, for example.

In the embodiment shown in FIG. 1A, system 100 may be implemented to provide collision avoidance imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a ranging sensor 148, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope and/or accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or other module of sonar system 110, ranging sensor 148, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, target tracking data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry and/or tracking data, as described herein.

In various embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with a speed, orientation, and/or position sensor (SPOS), sonar system 110 may be configured to store such information along with other sensor information (acoustic returns, temperature measurements, text descriptions, water depth, altitude, mobile structure speed, and/or other sensor and/or control information) available to system 100. In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as one or more of a display, a touchscreen, a keyboard, a mouse, a joystick, a knob, a steering wheel, a ship's wheel or helm, a yoke, and/or any other device capable of accepting user input and/or providing feedback to a user, such as information about a state of mobile structure 101 and/or a target detected by sonar system 110 and/or ranging sensor 148. In some embodiments, user interface 120 may include multiple displays and/or touchscreens that may be mounted to mobile structure 101 and/or be portable and disposed in proximity to mobile structure 101 and/or surrounding areas. For example, in various embodiments, user interface 120 may be implemented and/or operated according to any of the systems and methods described in U.S. Provisional Patent Application 62/069,961 filed Oct. 29, 2014 and entitled "PILOT DISPLAY SYSTEMS AND METHODS", and/or U.S. Provisional Patent Application 61/949,864 filed Mar. 7, 2014 and entitled "SAILING USER INTERFACE SYSTEMS AND METHODS", both of which are hereby incorporated by reference in their entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110, an element of ranging sensor 148) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for mobile structure 101, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110, ranging sensor 148) coupled to mobile structure 101, for example, and to generate control signals for adjusting an orientation of the actuated device according to the target attitude.

More generally, user interface 120 may be adapted to display sensor information to a user, for example, and/or to transmit sensor information and/or user input to other user interfaces, sensors, or controllers of system 100, for instance, for display and/or further processing. For example, in various embodiments, user interface 120 and/or controller 130 may be implemented and/or operated according to any of the systems and methods described in U.S. Provisional Patent Application 62/091,450 filed Dec. 15, 2014 and entitled "COLLISION AVOIDANCE SYSTEMS AND METHODS", which is hereby incorporated by reference in its entirety. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various elements of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, ranging sensor 148, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity (e.g., direction and magnitude) of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver, global navigation satellite system (GNSS/GLONASS) and/or receiver, and/or other device capable of determining absolute and/or relative position of mobile structure 101 (e.g., or an element of mobile structure 101, such as sonar system 110, ranging sensor 148, and/or user interface 120) based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate (e.g., a turning rate) of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Ranging sensor/system 148 may be implemented as one or more of an acoustic sensor, a sonar sensor, a sonic ranging sensor, an ultrasonic ranging sensor, a magnetometer, a radar sensor, a light detection and ranging (LIDAR) sensor, a Doppler sensor, an Automatic Identification System (AIS) transmitter/receiver/transponder, an Aircraft Communications Addressing and Reporting System (ACARS) transmitter/receiver/transponder, and/or other sensors or systems configured to detect a target, a projected course of a target, and/or other characteristics of a target remote from mobile structure 101. In embodiments where ranging sensor 148 is implemented as or with an AIS and/or ACARS receiver, for example, ranging sensor 148 may be configured to receive AIS signals and/or data and provide such ranging data to user interface 120 for display to a user, for example, or to controller 130 for additional processing, as described herein.

In some embodiments, ranging sensor 148 may be implemented as a radar system configured to detect one or more absolute and/or relative positions and/or a cross section (e.g., a radar cross section) of a target. A cross section of a target may be based on a return signal and/or signals corresponding to a shape, form, and/or profile of the target as sensed against a relatively distant background. For example, a cross section of a target sensed by ranging sensor/system 148 may include an outline of a profile of the target in one or two dimensions and a substantially homogenous ranging signal response within the profile, as seen and/or resolved by ranging sensor/system 148. In various embodiments, one or more orientations of a target may be determined based on successive relative positions of the target, for example, and/or a detected cross section of the target. For example, a relatively narrow cross section and/or successive relative positions in a radial direction may indicate the target is oriented with its bow or stern aimed at mobile structure 101. In such embodiments, the orientation of the target, including a heading and/or a heading angle, may be determined accordingly.

More generally, ranging sensor 148 may be configured to emit one, multiple, or a series of ranging signals, receive corresponding ranging returns, and/or convert the ranging returns into ranging data and/or imagery, such as radar data (e.g., relative position and/or size/presence), visible spectrum and/or infrared image data, and/or other types of ranging data. Ranging sensor 148 may be configured to provide such data and/or imagery to user interface 120 for display to a user, for example, or to controller 130 for additional processing, as described herein.

In some embodiments, ranging sensor 148 may be implemented using a compact design, where multiple sensors and/or associated processing devices are located within a single assembly housing that is configured to interface with the rest of system 100 through a single cable providing both power and communications to and from ranging sensor 148. In some embodiments, ranging sensor 148 may include orientation and/or position sensors configured to help provide two or three dimensional waypoints, increase ranging data and/or imagery quality, and/or provide highly accurate ranging data, as described herein.

In various embodiments, ranging sensor 148 may be implemented with optional orientation and/or position sensors (e.g., similar to orientation sensor 140, gyroscope/accelerometer 144, and/or GPS 146) that may be incorporated within its assembly housing to provide three dimensional orientations and/or positions of ranging sensor 148 for use when processing or post processing ranging data for display. The sensor information can be used to correct for movement of ranging sensor 148 between ensonifications/ranging signal emissions to provide improved alignment of corresponding returns/samples, for example, and/or to generate imagery based on the measured orientations and/or positions of ranging sensor 148. For example, in various embodiments, ranging sensor 148 may be implemented and/or operated according to any of the systems and methods described in U.S. Provisional Patent Application 62/044,911 filed Sep. 2, 2014 and entitled "REMOTE SENSING WITH INTEGRATED ORIENTATION AND POSITION SENSORS SYSTEMS AND METHODS", which is hereby incorporated by reference in its entirety. In other embodiments, an external orientation and/or position sensor can be used alone or in combination with an integrated sensor or sensors.

In embodiments where ranging sensor 148 is implemented with a speed, orientation, and/or position sensor (SPOS), ranging sensor 148 may be configured to store such information along with other sensor information (ranging signal returns, temperature measurements, text descriptions, distances/headings to target, altitude, mobile structure speed, and/or other sensor and/or control information) available to system 100. In various embodiments, controller 130 may be configured to control steering sensor/actuator 150 and/or propulsion system 170 to adjust a position and/or orientation of mobile structure 101 to help ensure proper registration of a series of ranging returns, for example, or to avoid collision with a detected hazard or target.

Although FIG. 1A shows various sensors and/or other components of system 100 separate from ranging sensor 148, in other embodiments, any one or combination of sensors and components of system 100 may be integrated with a sensor, an actuator, and/or other components of ranging sensor 148. For example, orientation sensor 140 may be integrated with a sensor of ranging sensor 148 and be configured to provide measurements of an absolute and/or relative orientation (e.g., a roll, pitch, and/or yaw) of the sensor to controller 130 and/or user interface 120, both of which may also be integrated with ranging sensor 148.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a light detection and ranging (LIDAR) system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example.

In some embodiments, other modules 180 may include one or more actuated devices (e.g., spotlights, infrared illuminators, cameras, radars, LIDARs, sonars, and/or other actuated devices) coupled to mobile structure 101, where each actuated device includes one or more actuators adapted to adjust an orientation of the device, relative to mobile structure 101, in response to one or more control signals (e.g., provided by controller 130). In still further embodiments, other modules 180 may include one or more sensors configured to measure a state of mobile structure 101 and/or an elements or subsystem of mobile structure 101, such as a fuel-usage sensor, one or more user proximity sensors, a light level sensor, an AIS transmitter and/or receiver, other types of target sensors, and/or other state sensors for mobile structure 101.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or another element of system 100 from various sensors, to determine an element orientation adjustment (e.g., relative to a desired orientation) from the sensor signals, and/or to control an actuator to adjust an element orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques or protocols between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of a sensor of system 100 that would be necessary to physically align a coordinate frame of the sensor with a coordinate frame of orientation sensor 140 and/or mobile structure 101, for example, or an absolute coordinate frame. Adjustments determined from such parameters may be used to selectively power adjustment servos/actuators (e.g., of sonar system 110, ranging sensor 148, and/or other sensors or elements of system 100), for example, or may be communicated to a user through user interface 120, as described herein.

Figure 1B:
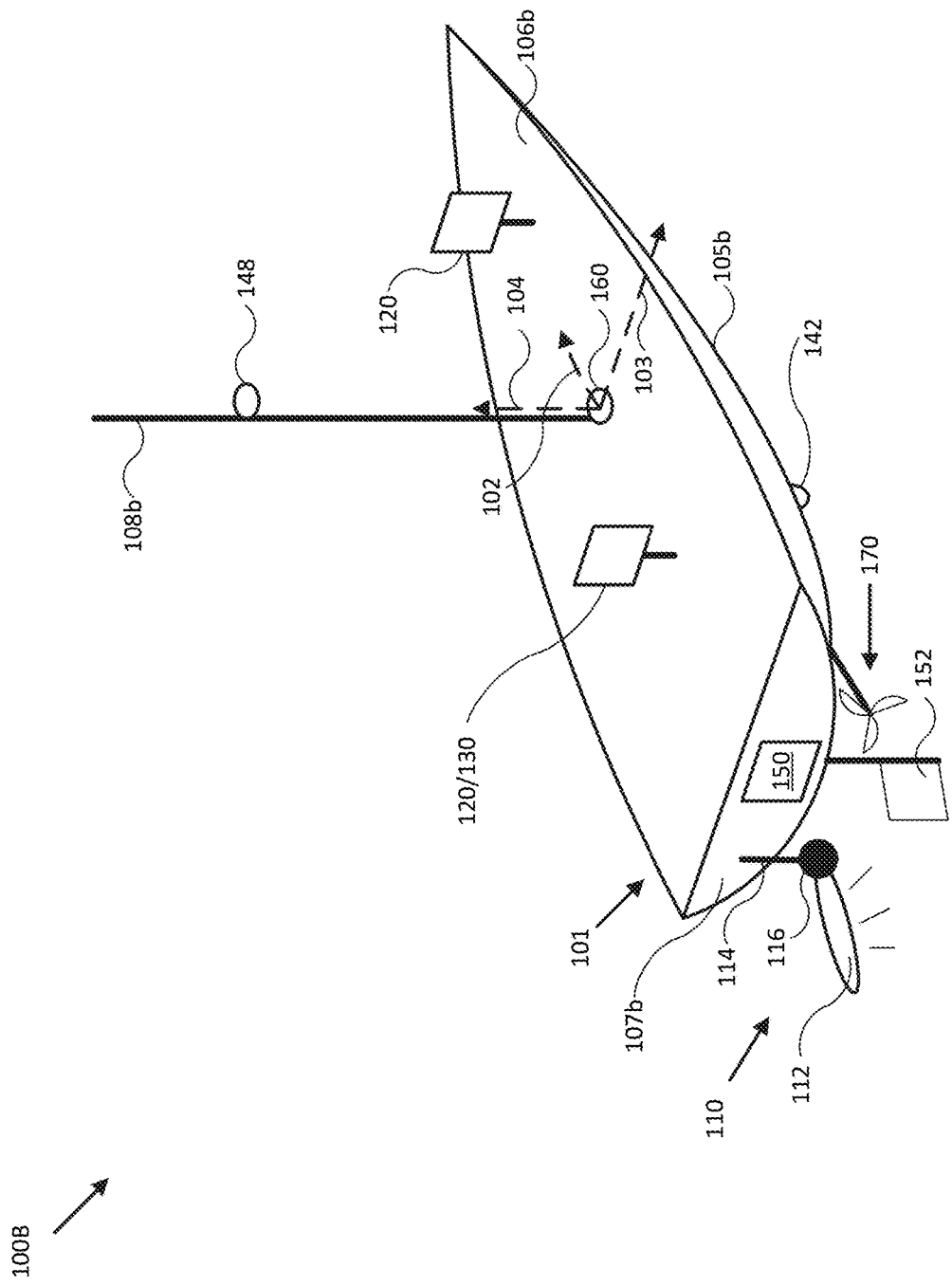
FIG. 1B illustrates a diagram of a pilot display system in accordance with an embodiment of the disclosure.

FIG. 1B illustrates a diagram of system 100B in accordance with an embodiment of the disclosure. As shown in FIG. 1B, system 100B may be implemented to provide collision avoidance data and/or imagery for use with operation of mobile structure 101, similar to system 100 of FIG. 1A. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), ranging sensor 148, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar or LIDAR system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein. In some embodiments, user interface/controller 120/130 may be configured to sweep transducer assembly 112 to ensonify a range of relative and/or absolute orientations.

In other embodiments, a similar bracket/actuator may be used to provide similar control and/or adjustment of an orientation of ranging sensor 148. Transducer assembly 112, ranging sensor 148, and/or other elements of system 100B may be implemented with a position and/or orientation sensor, which may include one or more sensors corresponding to orientation sensor 140, gyroscope/accelerometer 144 and/or GPS 146, for example, that is configured to provide absolute and/or relative positions and/or orientations and facilitate actuated orientation of the element or elements of system 100B.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101 and proximate areas surrounding mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In some embodiments, ranging sensor 148 may be mounted to a portion of mobile structure 101, such as to hull 105b, deck 106b, mast/sensor mount 108b, and/or other portions of mobile structure 101 where ranging sensor 148 is able to transmit and/or receive AIS signals, radar signals, lidar signals, visible spectrum and/or infrared spectrum light, and/or other ranging signals over relatively short through relatively long distances (e.g., relative to a size and/or speed of mobile structure 101), such as less than one or two lengths of mobile structure 101 through many hundreds of lengths of mobile structure 101 and/or many minutes of travel time for mobile structure 101. In various embodiments, ranging sensor 148 may be mounted to mobile structure 101 and be configured to detect targets and/or positions, courses, and/or other attributes of the targets, as described herein. Ranging sensor 148 may be configured to detect targets through various environmental conditions related to weather, climate, ambient light levels, and/or other conditions that typically influence an ability to send and/or receive particular types of ranging signals.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and/or interface or communicate with one or more devices of system 100B. Further, a logic device of that element may be adapted to perform any of the methods described herein.

Navigational displays typically provide a spatial view of the vehicle or mobile structure being navigated and objects or targets disposed about the mobile structure that might influence piloting of the mobile structure. A navigational or pilot display may be configured to display data and/or sensor information from a number of different sources, and such data can be shown segregated from each other in different views, for example, or can be combined into a single display so that multiple sources of data can be evaluated at once. Such displays can become cluttered with icons and data as traffic and/or the number of surrounding targets increases, and this effect can be magnified by the increase in sources of data available to pilots. Pilots require at least some information about each local target to evaluate their collective relevance to navigation of the mobile structure, but not all target information needs to be viewed at one time, and accessing more detailed information about a target should not be a source of distraction to the pilot.

For example, users of marine pilot displays often desire to query targets represented as target icons layered over a movable background, which may correspond to a marine chart or database that includes bathymetry data, shore contours, buoys, shallows, shipping lanes, and/or other features (e.g., a type of target) that can influence navigation of a watercraft. Target icons on a marine chart can correspond to such features, for example, and may also correspond to various mobile targets and/or non-charted navigation hazards, such as drifts, pollutant spills, schools of fish, forwarded or saved waypoints, and/or other watercraft/mobile structures traversing the same body of water. In other embodiments, a movable background may correspond to a visible spectrum, infrared, multi-spectral, and/or other spectrum video image (e.g., an output of a video camera), for example, and target icons may correspond to objects sensed and/or differentiable within the video image. In still further embodiments, a moveable background may correspond to a radar, sonar, and/or other updateable ranging sensor data and/or imagery.

Users may select items on the movable background (e.g., using a mouse, a touch screen, and/or other user interface modules) in order to seek information or carry out actions. Various selectable targets may also include targets identified through video analytics (visible spectrum, infrared, multi-spectral differentiation), radar targets (e.g., MARPA, ARPA, and/or non-tracked targets awaiting acquisition), AIS targets, forward looking/3D sonar identified targets, waypoints, tracks, cartography objects, MOB, known hazards of shallow depth, and/or other selectable targets.

In various embodiments, the display image may include a reference icon, which can be associated with an orientation and/or position of the mobile structure and/or a sensor (e.g., a sonar system, a radar, a camera, and/or other types of ranging sensors. For example, in one embodiment, the reference icon may correspond to mobile structure 101, and the shape and orientation of the icon as rendered on user interface 120, and its position relative to the display, may be configured to indicate positions of targets relative to positions and/or orientations of the mobile structure. In another example, the reference icon may correspond to a ranging sensor coupled to and/or associated with mobile structure 101, and the position and/or orientation of the reference icon in a display of user interface 120 may be configured to indicate positions of targets relative to positions and/or orientations of the ranging sensor.

Under various circumstances, it may be important for mobile structure 101 to avoid being in close proximity to a target. For example, a user will typically want to avoid any risk of a collision in open water. Any damage caused by a collision may immobilize mobile structure 101 and/or the target, possibly risking the life of any individuals on board mobile structure 101 and/or the target. In some instances, it may be challenging for a user of mobile structure 101 to evaluate the speed and/or the direction of a target in relation to mobile structure 101. For example, the target may be a large ship located far enough away from mobile structure 101 that visible inspection cannot provide a reliable estimate of the ship's speed and/or relative orientation. In such instances, it can be difficult or impossible for a user to evaluate a course of the target or to determine how mobile structure 101 should be piloted to avoid the target.

When a target is detected, one or more displays of the pilot display system may be configured to display a graphical representation of the target (e.g., a target icon), and/or a projected course (e.g., based on a detected/determined current heading and/or speed) of the target. In some embodiments, the pilot display system may receive information corresponding to the target through an AIS, a radar system, a lidar system, and/or other types of ranging sensors/systems, including multi-sensor ranging systems such as visual spectrum and/or infrared bearing and laser range-finding multi-sensor systems, for example. Typically, one or more positions of a target may be determined from ranging data provided by one or more ranging systems. For example, in embodiments where ranging sensor 148 is implemented with a radar system or lidar system, a pilot display system may receive one or more relative positions of the target (e.g., relative to mobile structure 101) and/or a cross section of the target from ranging sensor 148. In some instances, the relative positions of the target may be incorporated into image data generated by the pilot display system.

Some pilot display systems pause updating the moveable background when a target icon is selected to access additional and/or detailed information about the corresponding target. This can result in the reference icon and/or the target icon (e.g., where the corresponding target is mobile with respect to the movable background) moving outside the extents of the display, as designated by the display's (typically user-configurable) resolution and/or zoom level, which presents a safety risk in navigating the corresponding mobile structure since its position relative to potential navigation hazards can become ambiguous. Moreover, inelegant target selection methodologies (e.g., that clumsily address poor touchscreen alignment, close proximity of multiple target icons, and/or variable user dexterity due to motion of the mobile structure, the user's position, the user's age, and/or other characteristics having detrimental effect on the ability of a user to interface with user interface 120) can distract a pilot by causing the pilot to focus too narrowly on selecting a correct target, which can also present a risk to navigation.

Some methods are based on implementing a fixed offset between a selector position and a cursor during repositioning of a moveable background, which allows for the positioning of the cursor without it being obscured by the selector (e.g., a mouse pointer and/or a user finger). In embodiments of the present disclosure, there may not be a fixed offset. For example, the cursor may be configured to stay in a fixed or static position relative to the display and the moveable background may be slid underneath the cursor until a desired target is beneath the cursor. Moreover, embodiments of the present disclosure seek to avoid halting motion of the moveable background so that at least the reference icon or the target icon is displayed regardless of whether a user attempts to access additional information about a particular target. This allows embodiments to provide a relatively uncluttered view on the display because not all detailed information need be displayed at once and detailed information about one or more targets can be toggled without disrupting situational awareness of the reference icon and/or the target icon and without substantially distracting the user from navigation, as described herein.

The examples and/or explanations provided herein describe mobile structures and/or targets related to marine navigation, but the methodologies may be equally applicable to land and/or air-based applications, including navigation of land-based vehicles such as trucks, tanks, armored vehicles, and/or other vehicles configured to navigate terrain and/or land, and/or navigation of aircraft such as airplanes, jets, helicopters, and/or other aircraft configured to navigate through airspaces. FIGS. 2A-6C and the description that follows are presented with respect to two dimensions for simplicity, but it should be understood that the described principles may also be applied to three dimensional navigation scenarios, for example.

Figure 2A:
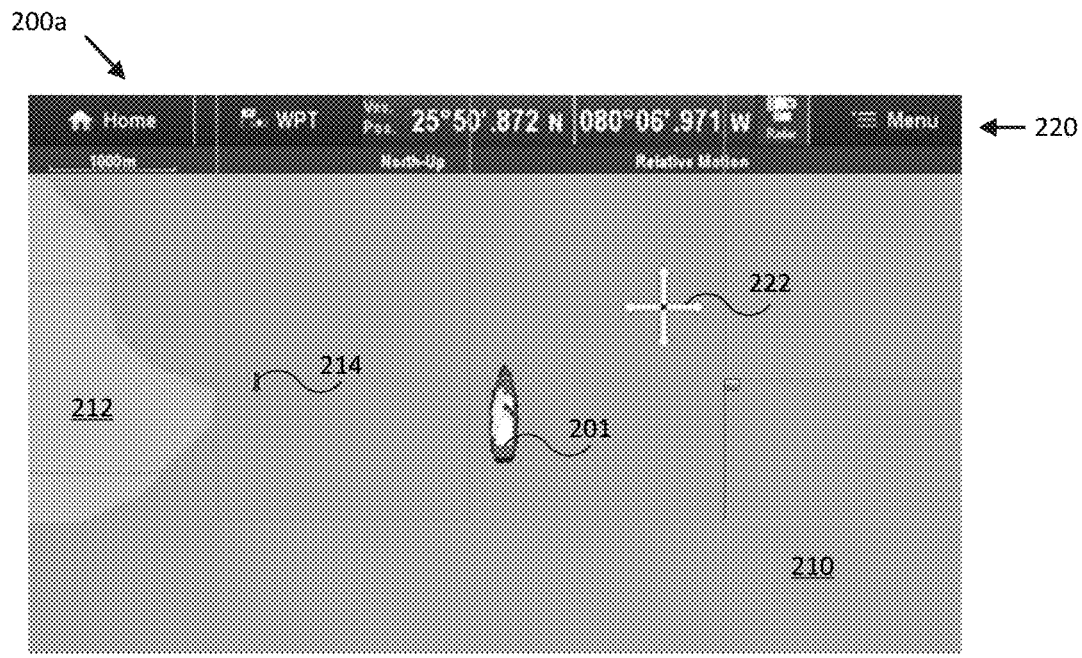
FIGS. 2A-B illustrate image data generated by a pilot display system in accordance with an embodiment of the disclosure.
Figure 2B:
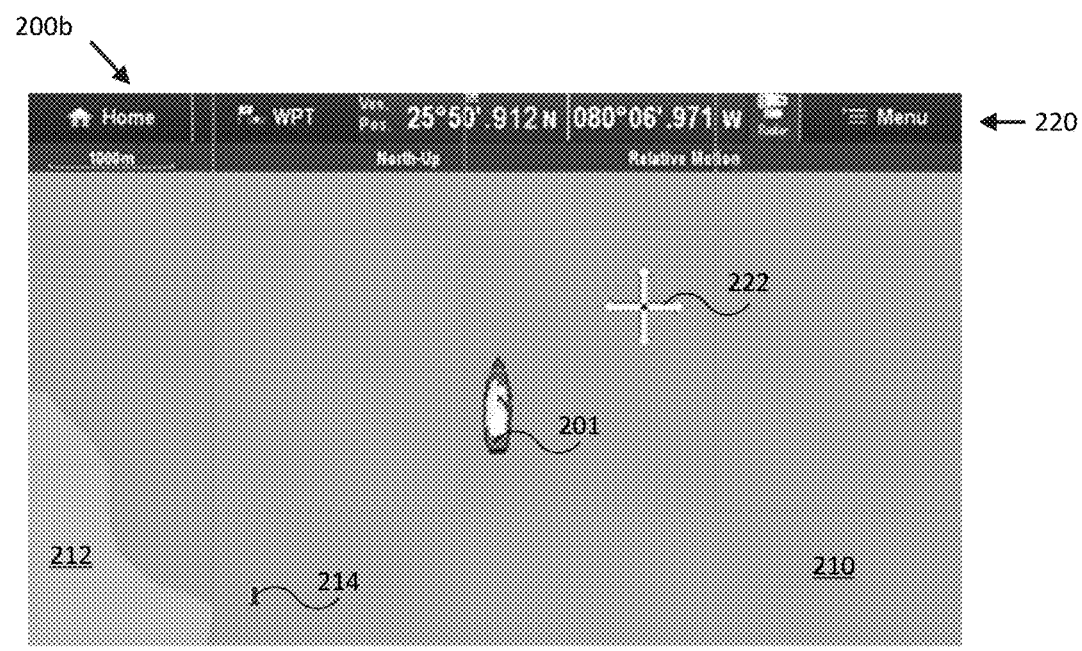

FIGS. 2A-B illustrate image data 200a-b generated by a pilot display system (e.g., system 100 of FIG. 1A and/or system 100B of FIG. 1B) in accordance with an embodiment of the disclosure. As shown, image data 200a depicts reference icon 201 (e.g., corresponding to mobile structure 101 and/or a ranging sensor of mobile structure 101), water surface 210, land surface 212, target icon 214 (e.g., corresponding to a buoy, waypoint, and/or other target in water surface 210), and screen cursor 222. In various embodiments, reference icon 201 may be rendered substantially statically relative to a display (e.g., corresponding to the edges of image data 200a), such as being rendered to be centered and oriented bow-up across multiple updates over time, as shown in FIG. 2A. Screen cursor 222 may be configured to indicate a target is not currently selected when screen cursor 222 is rendered (e.g., as opposed to a target cursor), for example, and a user configurable width and/or length of screen cursor 222 may be configured to indicate a selected portion of image data 200a which a target icon must intersect and/or adjoin to be selected by screen cursor 222. In some embodiments, image data 200a may include header 220 when rendered in a display, which may include various interface buttons, menus, configuration data, sensor data, and environmental conditions.

Image data 200b depicts the same objects after a period of time has passed and the system corresponding to reference icon 201 has moved (e.g., as shown by the position data in header 220 and the updated position of land surface 212 and target icon 214). While operating in "relative motion" mode, as shown in FIGS. 2A-B, reference icon 201 can be configured to remain static in the center of the display (e.g., in the center of image data 200a), and the remaining objects (e.g., the moveable background or "chart") rendered in the display are repositioned as positions and/or orientations of reference icon 201 are updated. In some embodiments, the relative motion mode can be temporarily paused, such as when a user pans the moveable background by providing a user drag (e.g., touch and drag on a touchscreen, and/or click and drag with a mouse, for example). While in a paused state, the moveable background (e.g., water surface 210 and/or land surface 212) would remain static and reference icon 201 would move according to its updated positions and/or orientations. Restoring the relative motion mode may return the reference icon 201 to screen-center with the moveable background moving accordingly. In image data 200a-b, as reference icon 201 traverses water surface 210 northwards, the moveable background (and charted target icons such as target icon 214) move lower and/or exit the display. In various embodiments, screen cursor 222 (if rendered) may be configured to remain static relative to the display and stay rendered within image data 200a-b rather than exiting the display with other features and/or targets in the moveable background.

Figure 3A:
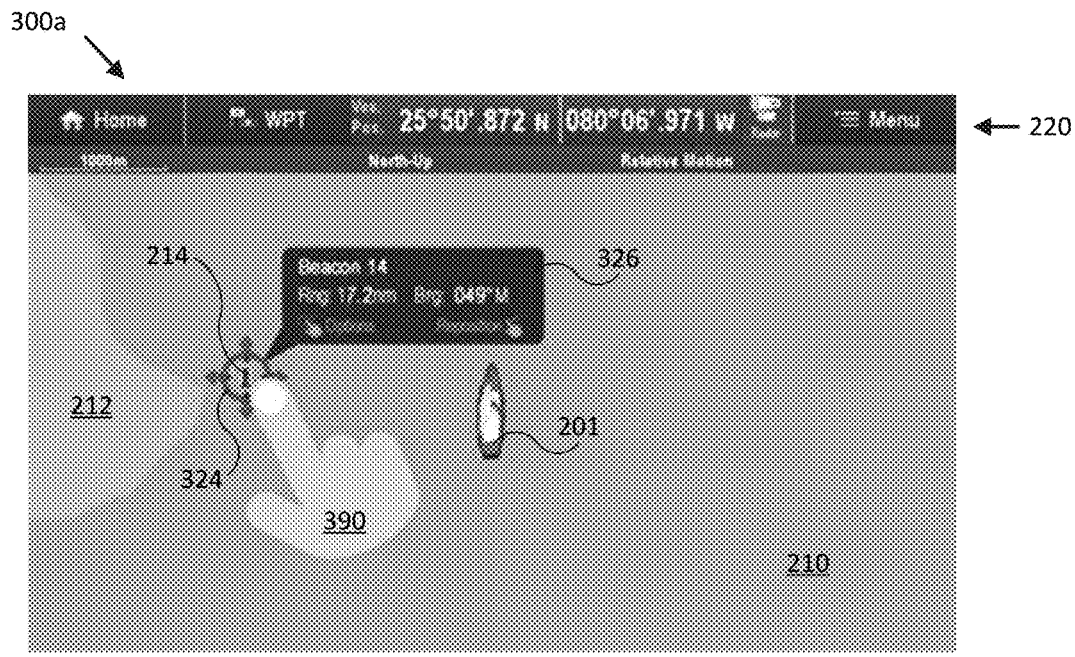
FIGS. 3A-C illustrate image data generated by a pilot display system in accordance with an embodiment of the disclosure.
Figure 3B:
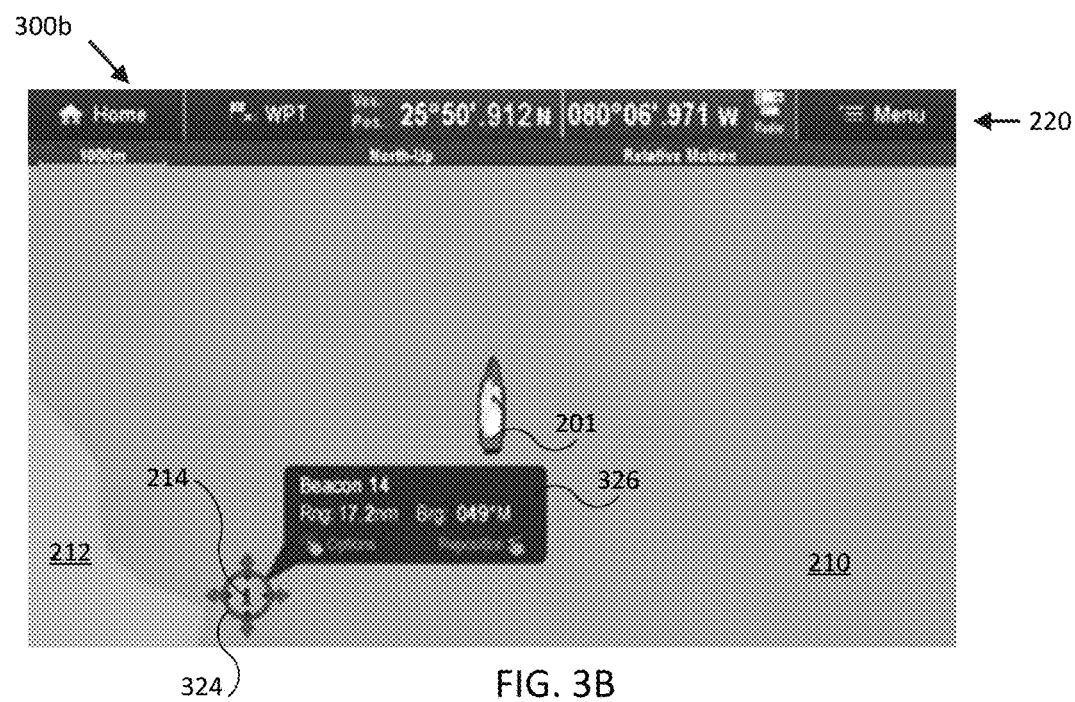
Figure 3C:
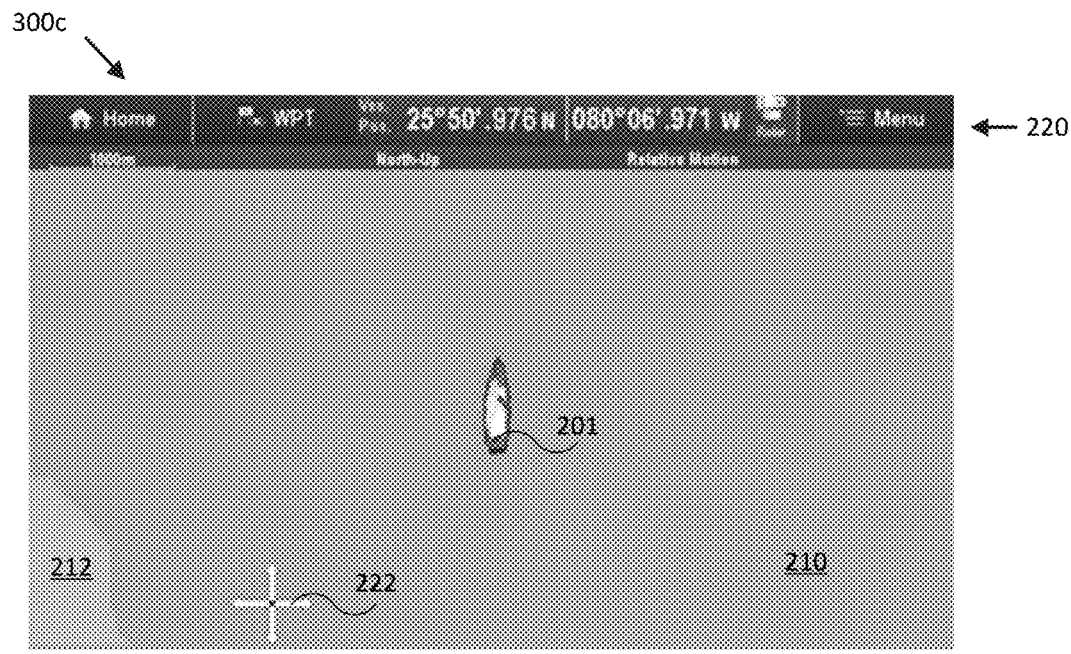

FIGS. 3A-C illustrate image data 300a-c generated by a pilot display system (e.g., system 100 of FIG. 1A and/or system 100B of FIG. 1B) in accordance with an embodiment of the disclosure. As shown, image data 300a includes target cursor 324, target dialog 326, and selector 390. Selector 390 may correspond to a user's finger (e.g., in the context of a touch screen user interface), a mouse pointer, and/or other selector that can be used to select a portion of image data 300a and/or target icon 214. Target cursor 324 may be rendered subsequent to selection of target icon 214, for example, and may be configured to indicate the selected target icon 214 and/or at least partially graphically link target dialog 326 to target icon 214, as shown. In some embodiments, screen cursor 222 of FIGS. 2A-B may be rendered on the display prior to user selection of target icon 214. Target dialog 326 may be configured to provide identifying and/or partial detailed information about a corresponding target, such as a chart name (e.g., beacon 14), a range, and/or a bearing, and may in some embodiments include selectable buttons to perform navigation display functions, be graphically linked to target icon 214 (e.g., at least partially through target cursor 324), and/or be rendered substantially statically relative to the selected target icon 214.

Such static rendering of target dialog 326 is illustrated by image data 300b, which includes many of the same features as image data 300a after a period of time has passed and the system corresponding to reference icon 201 has moved (e.g., as shown by the position data in header 220 and the updated position of land surface 212 and target icon 214). For example, in some embodiments, mobile structure 101 and/or a ranging system of mobile system 101 may be implemented with and/or coupled to a speed, position, and/or orientation sensor (SPOS), and user interface/controller 120/130 may be configured to receive a series of speeds, positions, and/or orientations from the SPOS and render features other than reference icon 201 in image data 300a-b to indicate a change in position and/or orientation of mobile structure 101 and/or an associated ranging system, for example, or to indicate positions of features (e.g., target icon 214) relative to positions and/or orientations of mobile structure 101 and/or an associated ranging system. In various embodiments, user interface/controller 120/130 may be configured to receive one or more positions of a target, corresponding to target icon 214, from a target database and/or a ranging sensor, for example, and to render the moveable background and/or other objects (e.g., target icon 214) to indicate positions of the target relative to positions and/or orientations of mobile structure 101. As can be seen from image data 300a-b, in various embodiments, reference icon 201 remains substantially static while the moveable background and/or other rendered objects are repositioned to indicate the changing relative positions/orientations.

This differs from other methods in beneficial ways. For example, one other method would freeze the moveable background relative to the selected portion of image data 300a and/or target icon 214. As reference icon 201 and/or target icon 214 continued to move, either reference icon 201 would move out of view (e.g., and user input would be required to re-center reference icon 201), or target icon 214 would move away from target cursor 324 or out of view. By contrast, embodiments of the present disclosure lock target cursor 324 to target icon 214 and/or to the movable background instead of the display, and the "relative motion" mode remains in effect so that the moveable background, target icon 214, target cursor 324, and target dialog 326 all move in lockstep (e.g., if the corresponding target is stationary).

Image data 300c of FIG. 3C illustrates one method for automatically removing target icon 214, target cursor 324, and/or target dialog 326 from image data 300c to reduce system resource needs. For example, user interface/controller 120/130 may be configured to determine, based at least in part on a series of positions and/or orientations of mobile structure 101 and/or an associated ranging sensor (e.g., corresponding to reference icon 201) and/or one or more positions of a target corresponding to target icon 214, that a position of the target relative to a position and/or orientation of the mobile structure is too large to render on the display. Upon such determination, target icon 214 and target dialog 326 may be removed from the display, and/or screen cursor 222 may be rendered in place of target icon 214, target dialog 326, and/or target cursor 324. Thus, if the group of target related features reaches an extent of the display, target dialog 326 is dismissed, and the target cursor 324 reverts to screen cursor 222 and may remain static on the display.

Figure 4A:
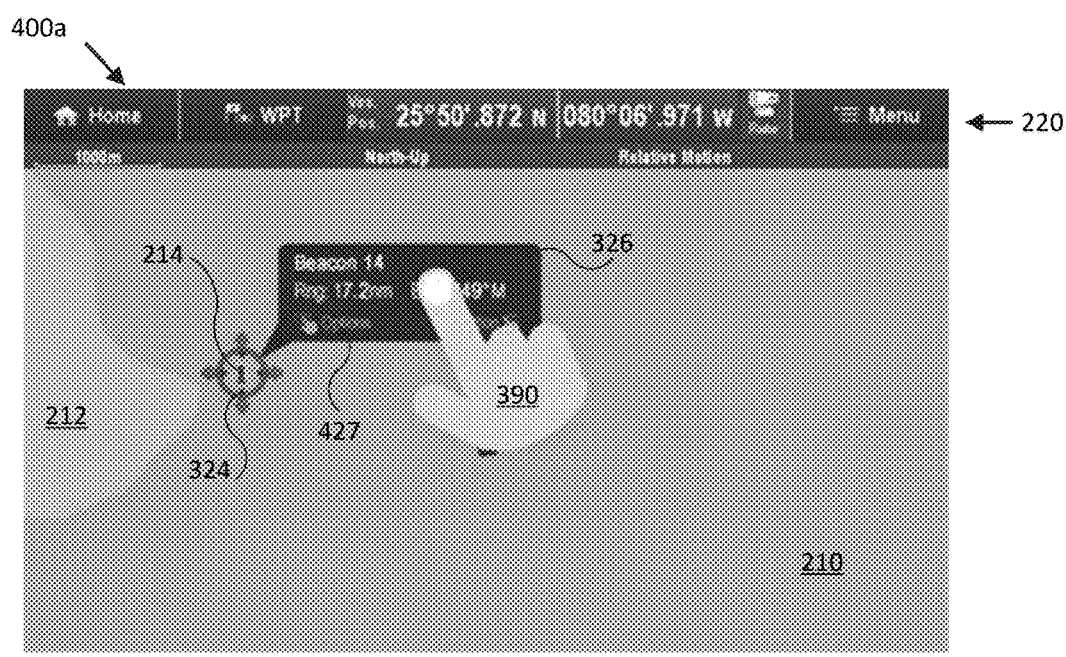
FIGS. 4A-B illustrate image data generated by a pilot display system in accordance with an embodiment of the disclosure.
Figure 4B:
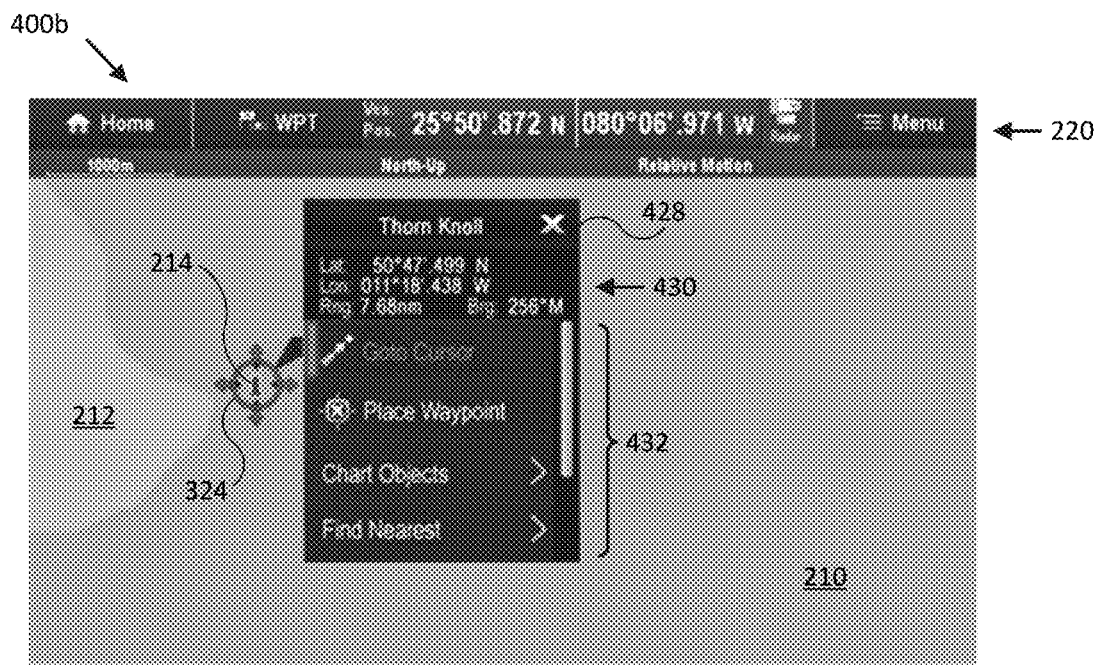

FIGS. 4A-B illustrate image data 400a-b generated by a pilot display system (e.g., system 100 of FIG. 1A and/or system 100B of FIG. 1B) in accordance with an embodiment of the disclosure. As shown, image data 400a-b illustrates how target dialog 326, which may include navigational display options button 427, may be used to access additional details information and/or to perform navigation and/or other operations functions of mobile structure 101. For example, selector 390 may be used to select target dialog 326 and/or options button 427, for example, and target menu 428 may be rendered in response to the user selection. As shown in image data 400*b*, in some embodiments, target menu 428 may include more specific or extensive target data, such as absolute position data 430 for example, in addition to or as an alternative to various menu options 432 that may be selected (e.g., according to configuration data) to autopilot mobile structure to or around target icon 214, for example, and/or to perform other operations associated with operation of mobile structure 101 and/or a system of mobile structure 101. Thus, to gain more data or options with regard to selected target icon 214, a user can select target dialog 326 itself to invoke target menu 428.

In various embodiments, target icon 214 and/or target menu 428 may be rendered substantially statically relative to the display (e.g., where the relative motion mode is paused) until target menu 428 is dismissed by user selection. During such pause, reference icon 201 may drift off the display, as described herein. In alternative embodiments, target icon 214 and/or target menu 428 may continue to move with a moveable background until either or both come in contact with an edge of image data 300*c*.

FIGS. 5A-D illustrate image data 500*a*-*d* generated by a pilot display system (e.g., system 100 of FIG. 1A and/or system 100B of FIG. 1B) in accordance with an embodiment of the disclosure. As shown in image data 500*a*-*d*, if an initial user selection misses an intended target, the user can reposition the moveable background underneath target cursor 324 by initiating a user drag from a point within target dialog 326, such as reposition button 534. The moveable background can be panned by the user drag such that target icon 214 is substantially aligned with target cursor 214, as shown by arrow 537 in image data 500*c* illustrating movement of almost all features in image data 500*c* except for target cursor 324 and transparent target dialog 536.

In various embodiments, initiation of a user drag may pause the relative motion mode, as described herein, and in some embodiments target dialog 326 may be rendered as or replaced with substantially transparent target dialog 536 to facilitate view of the various features while aligning target icon 214 with target cursor 324. At termination of a user drag, such as when the user removes their finger from the touchscreen or releases a mouse button, the area underneath the cursor may be re-queried for various target icons, such as target icon 214, and target dialog 326 may replace substantially transparent dialog 536, as shown in 500*d*.

For example, a user may attempt to select target icon 214, similar to what is illustrated with selector 390 in FIG. 3A. User interface/controller 120/130 may be configured to receive the user selection indicated by selector 390, which may indicate a portion of the display (e.g., image data 300*a*) adjacent to the physical position of selector 390 relative to image data 300*a*, and user interface/controller 120/130 may then determine whether the indicated portion of the display intersects or adjoins target icon 214.

In one embodiment, such determination may be performed by rendering screen cursor 222 at the indicated portion and determining that an area of the display that corresponds to a shape (e.g., a height and/or width) of screen cursor 222 intersects and/or adjoins target icon 214. In various embodiments, the shape of screen cursor 222 may be user selected as configuration data, for example, or may be adjusted according to a selected zoom level (e.g., smaller for smaller zoom levels) for the display.

Figure 6A:
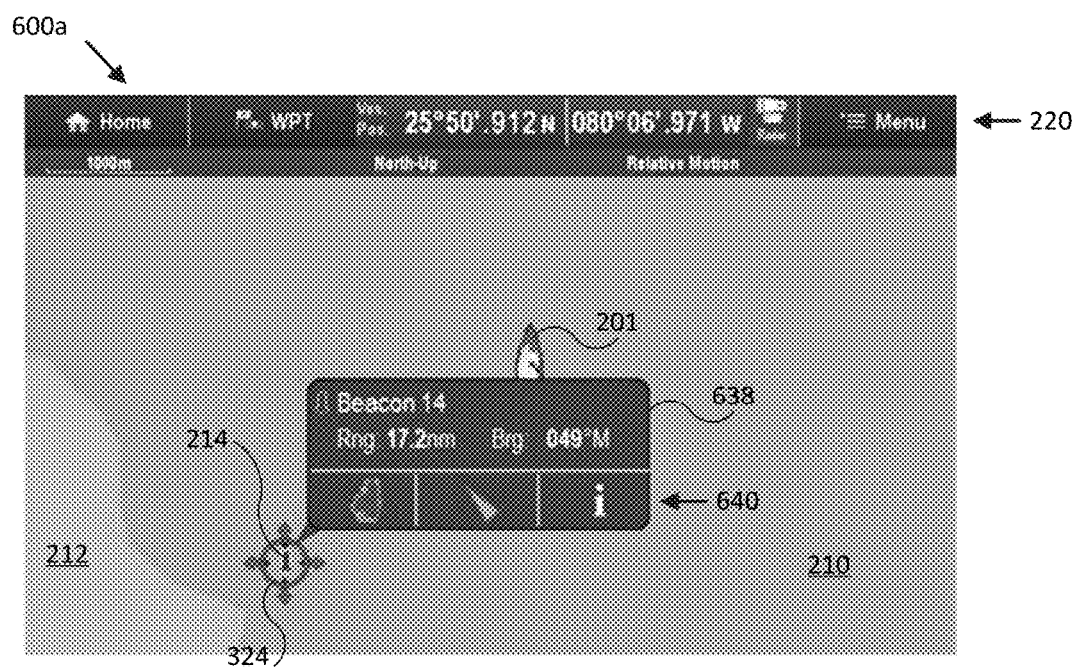
FIGS. 6A-B illustrate image data generated by a pilot display system in accordance with an embodiment of the disclosure.
Figure 6B:
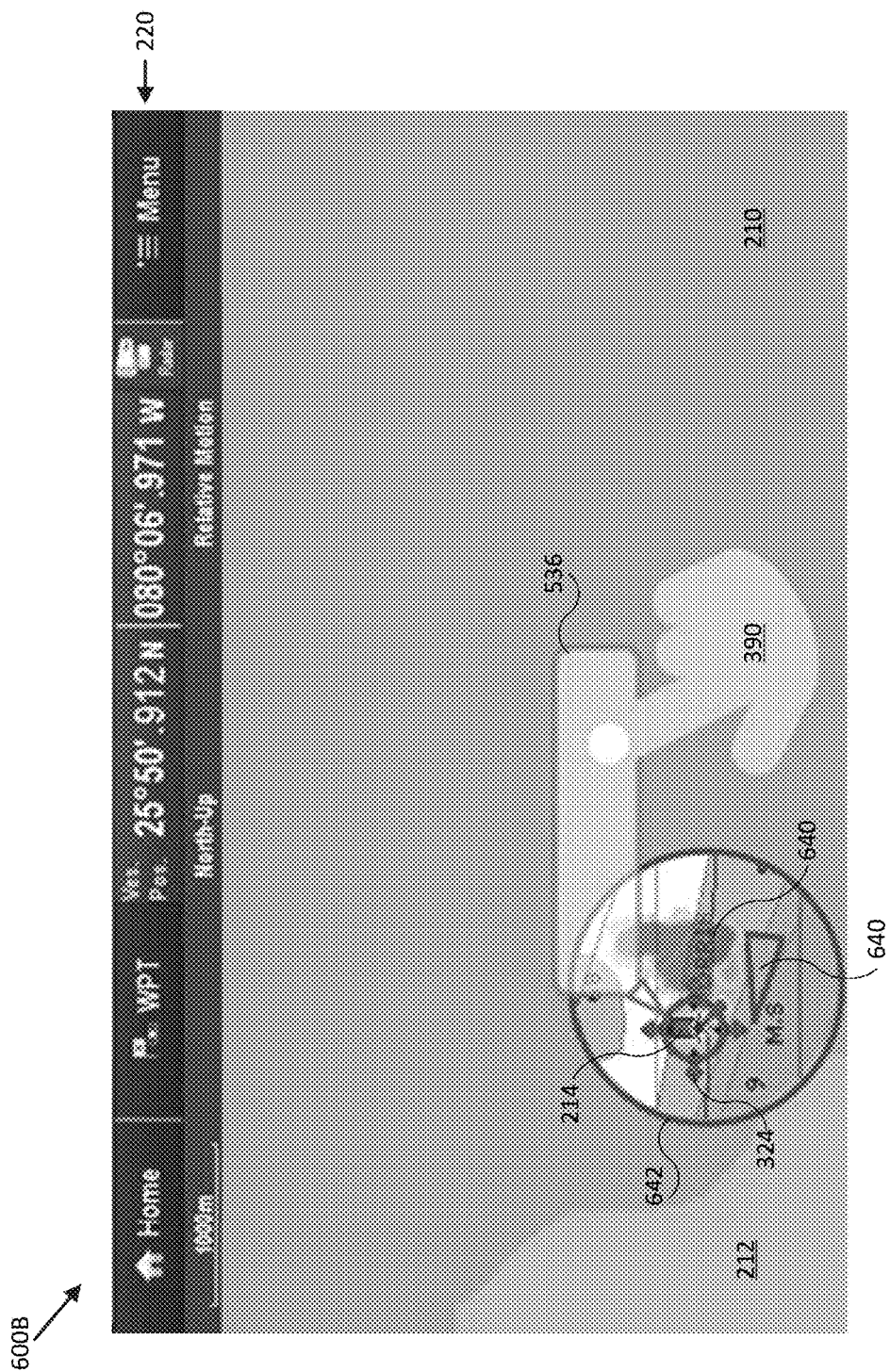

FIGS. 6A-B illustrate image data 600*a*-*b* generated by a pilot display system (e.g., system 100 of FIG. 1A and/or system 100B of FIG. 1B) in accordance with an embodiment of the disclosure. As shown, 600*a*-*b* illustrate additional ways to determine that the indicated portion of the display intersects or adjoins target icon 214. For example, in the embodiment shown in image data 600*a*, determining that the indicated portion of the display intersects or adjoins target icon 214 may be performed by rendering target selection dialog 638 comprising a list of selectable target icons 640 intersected and/or adjoined by the area of the display that corresponds to the shape of screen cursor 222, and receiving user selection of target icon 214 in target selection dialog 638 (e.g., using selector 390). As such, target selection dialog 638 may indicate which target icons 640 are in proximity to the location of target cursor 324 to allow the user to select which target icons 640 (e.g., including target icon 214) the user is interested in accessing in more detail.

In the embodiment shown in image data 600*b*, determining that the indicated portion of the display intersects or adjoins target icon 214 may be performed by rendering zoom window 642 configured to provide increased spatial detail at least at the indicated portion, displaying each of selectable target icons 640 intersected and/or adjoined by the area of the display that corresponds to the shape of screen cursor 222, and receiving user drag at the display to substantially align target icon 214 with the indicated portion and/or target cursor 324. In some embodiments, while target dialog 326 or 536 is held down or dragged, the area around target cursor 324 may be zoomed in order to allow greater differentiation of local target icons 640.

Figure 5A:
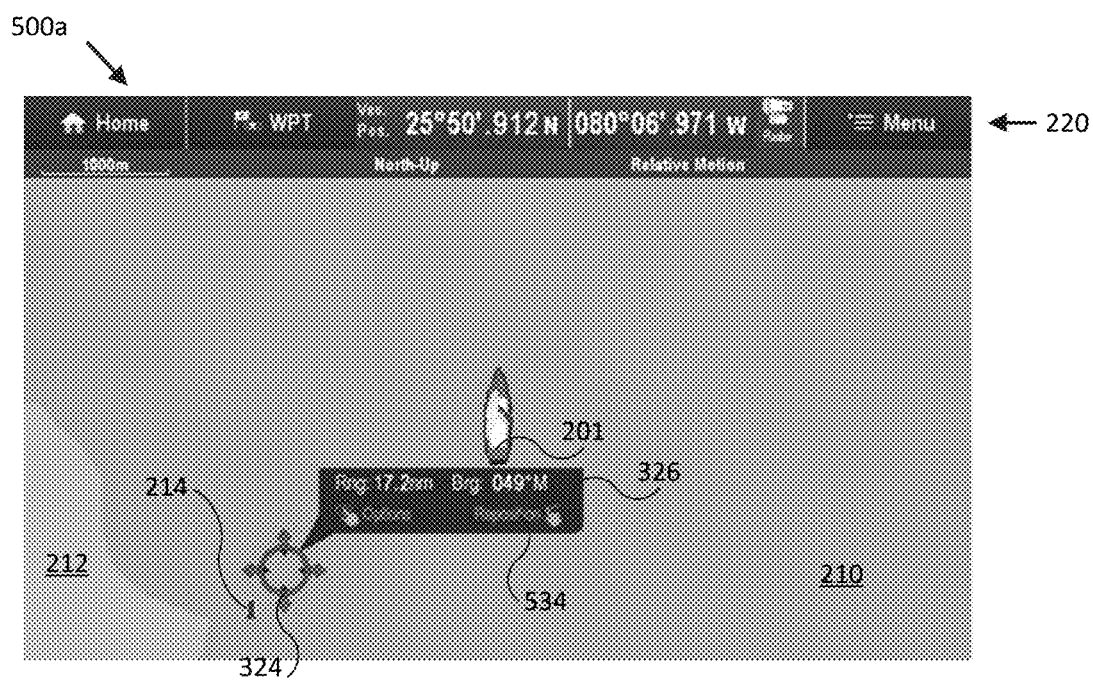
FIGS. 5A-D illustrate image data generated by a pilot display system in accordance with an embodiment of the disclosure.
Figure 5B:
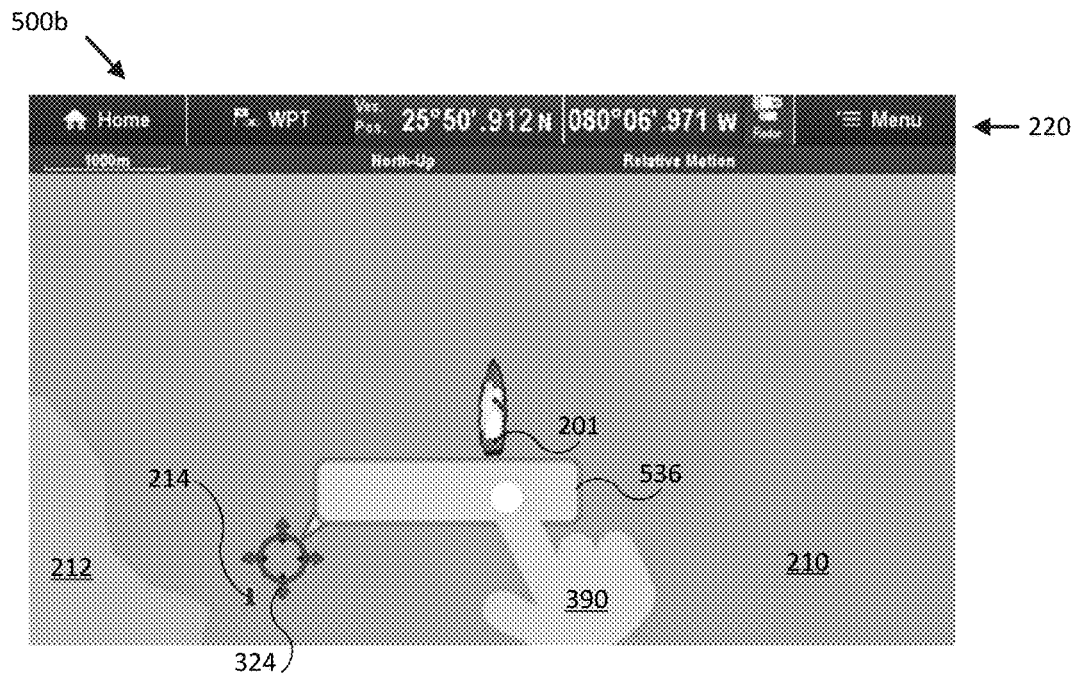
Figure 5C:
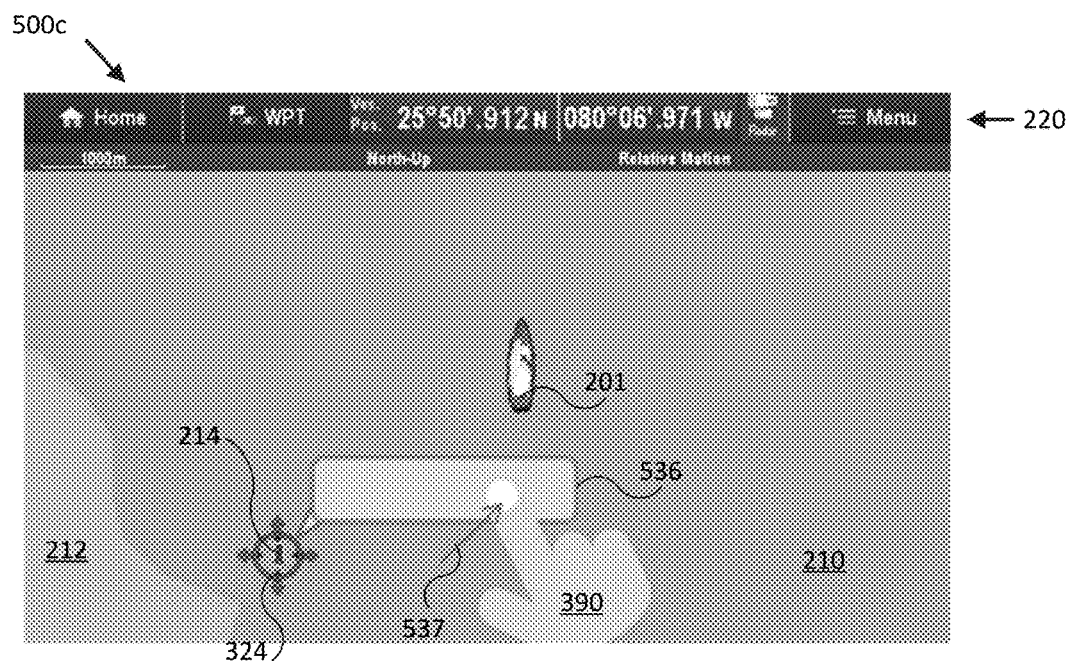
Figure 5D:
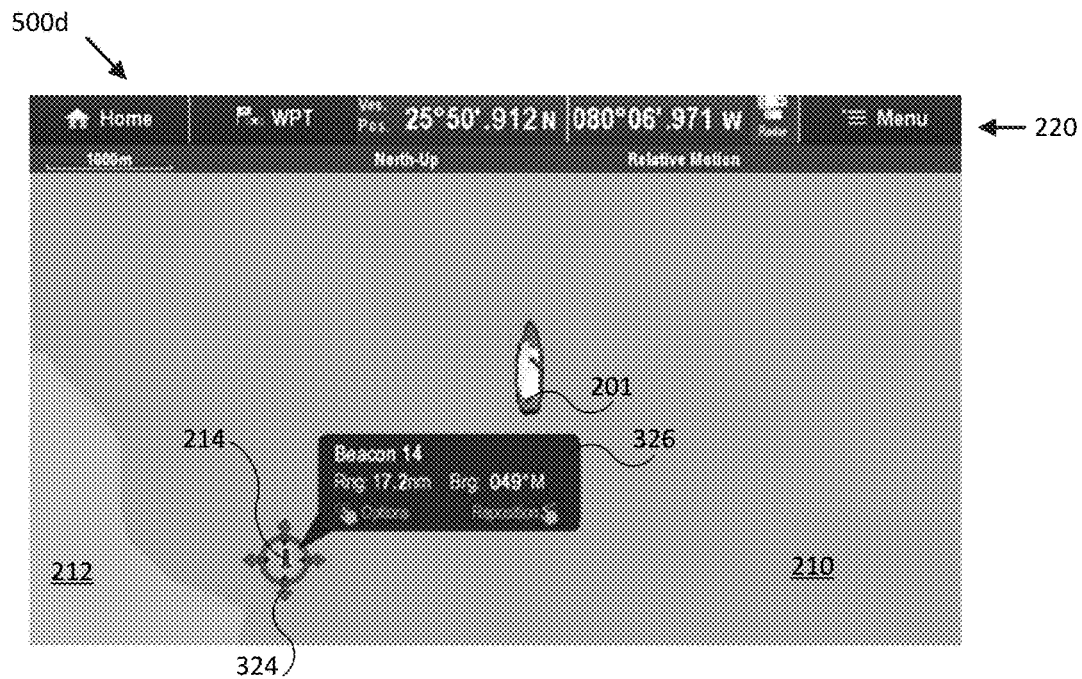

In another example, a user may attempt to select target icon 214, similar to what is illustrated with selector 390 in FIG. 3A, yet miss, as illustrated in FIG. 5A. User interface/controller 120/130 may be configured to receive user selection indicating a portion of the display and determining that the indicated portion does not intersect or adjoin the target icon. Upon such determination, target dialog 326 may be rendered on the display (e.g., either opaquely, or transparently in the form of target dialog 536) substantially statically relative to the indicated portion (e.g., rendered in a paused relative motion mode). User interface/controller 120/130 may be configured to receive a user drag at the display, to reposition target icon 214 according to the received drag to substantially align target icon 214 with the indicated portion, and to determine that the indicated portion (e.g., target cursor 324) intersects or adjoins the target icon, as described herein.

Figure 7:
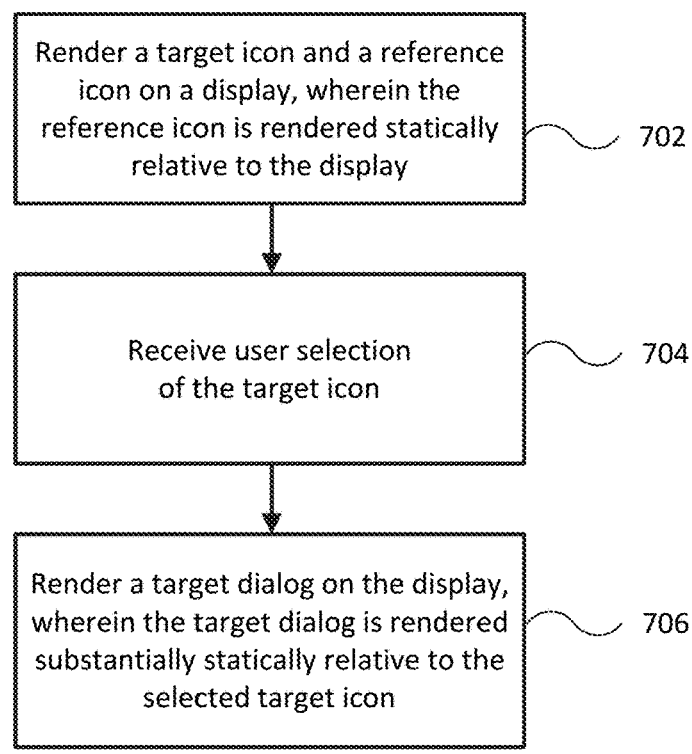
FIG. 7 illustrates a flow diagram of various operations to operate a pilot display system in accordance with an embodiment of the disclosure.

Turning now to FIG. 7, FIG. 7 illustrates a flow diagram of process 700 to provide image data for mobile structure 101 in accordance with embodiments of the disclosure. In some embodiments, the operations of FIG. 7 may be implemented as software instructions executed by one or more logic devices associated with corresponding electronic devices, sensors, and/or structures depicted in FIGS. 1A-B. More generally, the operations of process 700 may be implemented with any combination of software instructions and/or electronic hardware (e.g., inductors, capacitors, amplifiers, actuators, or other analog and/or digital components).

It should be appreciated that any step, sub-step, sub-process, or block of process 700 may be performed in an order or arrangement different from the embodiment illustrated by FIG. 7. For example, in other embodiments, one or more blocks may be omitted from or added to the process.

Furthermore, block inputs, block outputs, various sensor signals, sensor information, calibration parameters, and/or other operational parameters may be stored to one or more memories prior to moving to a following portion of a corresponding process. Although process 700 is described with reference to systems described in reference to FIGS. 1A-B, process 700 may be performed by other systems and/or operated to generate image data different from those in FIGS. 1A-B and including a different selection of electronic devices, sensors, assemblies, mobile structures, mobile structure attributes, and/or image data constituents.

Process 700 represents a method for generating image data 200a-b, 300a-c, 400a-b, 500a-c, and/or 600a-c via user interfaces 120/130, for example, in accordance with embodiments of the disclosure. At the initiation of process 700, various system parameters may be populated by prior execution of a process similar to process 700, for example, or may be initialized to zero and/or one or more values corresponding to typical, stored, and/or learned values derived from past operation of process 700, as described herein.

In block 702, a logic device renders a target icon and a reference icon on a display, wherein the reference icon is rendered statically relative to the display. For example, controller 130 of systems 100 or 100B may be configured to render target icon 214 and reference icon 201 on a display of user interface 120, and reference icon 201 may be rendered statically relative to the display, at least initially, to keep reference icon 201 visible while piloting mobile structure 101.

In block 704, a logic device receives user selection of the target icon. For example, controller 130 of systems 100 or 100B may be configured receive user selection including a touch on a touch screen, a mouse motion and/or button click, and/or other user selection detected by user interface 120, of target icon 214. As noted herein, if the initial user selection misses, controller 130 may be configured to provide for adjustment of target cursor 324, for example, and/or to provide lists, dialogs, menus, indicators, and/or zoomed areas near target icon 214 to allow for selection of target icon 214.

In block 706, a logic device renders a target dialog on the display, wherein the target dialog is rendered substantially statically relative to the selected target icon. For example, controller 130 may be configured to render target dialog 326 on the display, and target dialog 326 may be rendered substantially statically relative to the selected target icon, which may move relative to the display and/or reference icon 201. Thus, embodiments of the present disclosure provide safe and selectably verbose navigation and/or other information that may be used to facilitate operation of mobile structure 101.

It is contemplated that any one or combination of methods to provide avoidance areas may be performed according to one or more operating contexts of a control loop, for example, such as a startup, learning, running, and/or other type operating context. For example, process 700 may proceed back to block 702 and proceed through process 700 again to render additional target dialogs, as in a control loop.

Figure 8A:
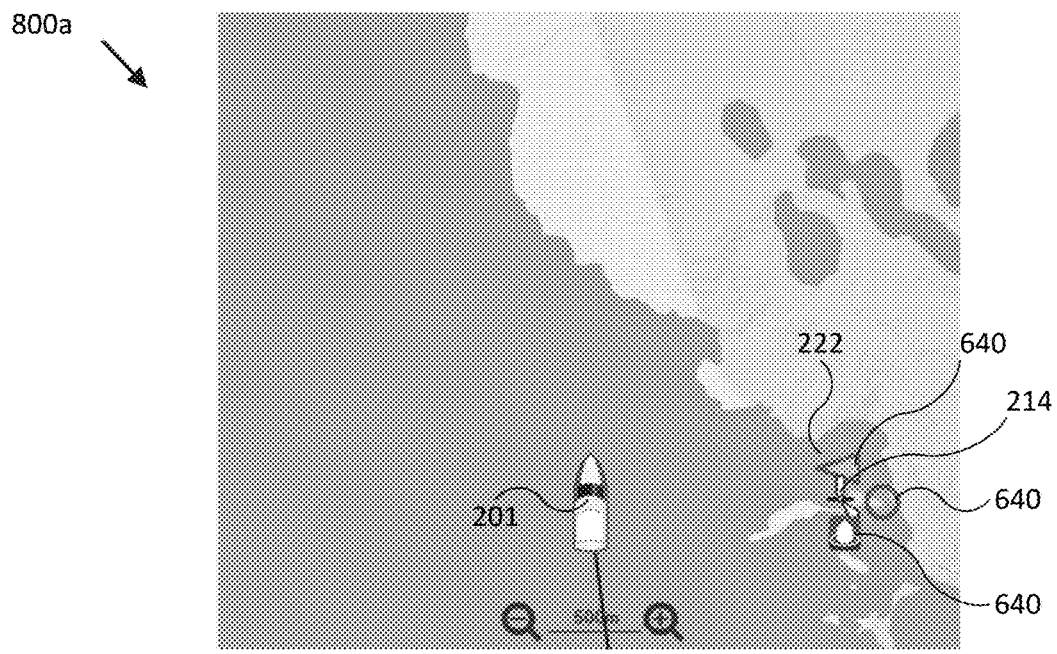
FIGS. 8A-C illustrate image data generated by a pilot display system in accordance with an embodiment of the disclosure.
Figure 8B:
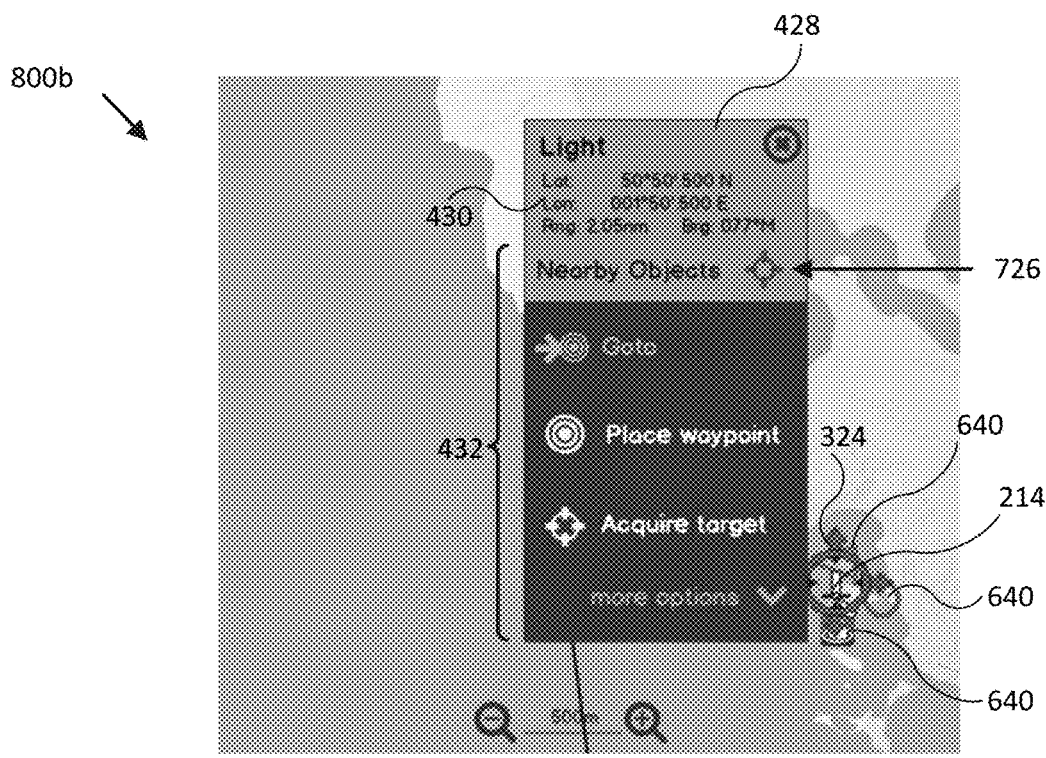
Figure 8C:
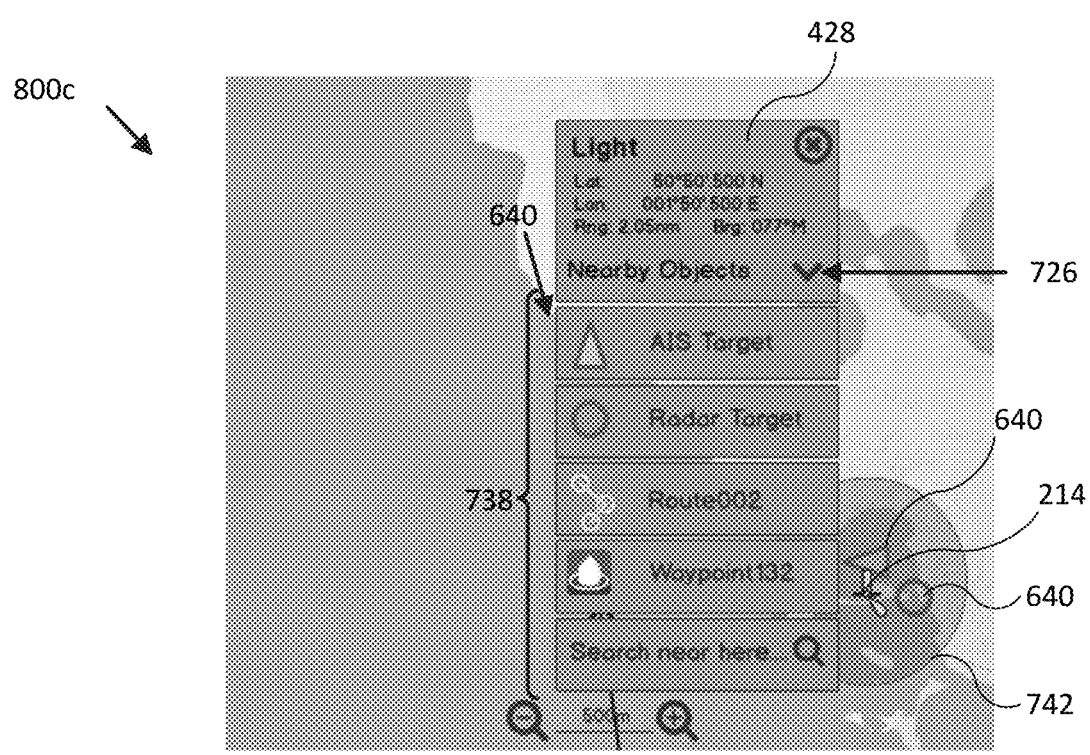

FIGS. 8A-C illustrate image data 800a-c generated by a pilot display system (e.g., system 100 of FIG. 1A and/or system 100B of FIG. 1B) in accordance with an embodiment of the disclosure. As shown, 800a-c illustrate additional ways to determine that the indicated portion of the display intersects or adjoins target icon 214. For example, in the embodiment shown in FIG. 8A, image data 800a includes reference icon 201 rendered adjacent target icon 214 and other selectable target icons 640 that are near screen cursor 222. As shown in image data 800b of FIG. 8B, determining that the indicated portion of the display intersects or adjoins target icon 214 may be performed, at least in part, by rendering target menu 428 including a list of selectable menu options 432, which themselves include target dialog button 726, and receiving user selection of target dialog button 726 in target menu 428 (e.g., using selector 390). In some embodiments, target menu 428 and/or target cursor 324 may be rendered in response to user touch at screen cursor 222 as shown in image data 800a. In various embodiments, target menu 428 may include position data 430 corresponding to a currently selected target icon 214, which may correspond to the target nearest a center of target cursor 324, for example, or to a target icon most completely overlapped or surrounded by target cursor 324, as a function of pixels of the target icon. In other embodiments, target menu 428 may include position data 430 corresponding to any one of target icons 640 near target cursor 324, selected based on name, position, type, proximity to reference icon 201, and/or other criteria.

Upon selection of target dialog button 726, determining that the indicated portion of the display intersects or adjoins target icon 214 may be performed, at least in part, by rendering target menu 428 including target selection dialog 738 (e.g., similar to target selection dialog 638 of FIG. 6A) comprising a list of selectable target icons 640 intersected and/or adjoined by the area of the display that corresponds to the shape of screen cursor 222 and/or target cursor 324, and receiving user selection of target icon 214 in target selection dialog 738 (e.g., using selector 390). As such, target selection dialog 738 may indicate which target icons 640 are in proximity to the location of target cursor 324 to allow the user to select which target icons 640 (e.g., including target icon 214) the user is interested in accessing in more detail. In some embodiments, target selection dialog 738 may include target icons 640 corresponding to those nearest to target cursor 324 and/or reference icon 201, for example, that are not currently selected and detailed in target menu 428 (e.g., light target icon 214 is absent from target selection dialog 738 in image data 800c because it is currently selected and detailed in target menu 428, as shown). The maximum number of selectable target icons 640 in target selection dialog 738 may be fixed, for example, or may be variable by user selection of a corresponding control parameter.

In various embodiments, and as shown in image data 800c, determining that the indicated portion of the display intersects or adjoins target icon 214 may be performed, at least in part, by rendering target selection area indicator 742 configured to indicate the area in image data 800c corresponding to the list of targets provided in target selection dialog 738. In some embodiments, target selection area indicator 742 may correspond to a semitransparent disk centered approximately at the currently selected target icon 214 and/or target cursor 324. Such disk may have a predetermined radius (e.g., selected by a user) corresponding to a particular distance and/or to a particular zoom level of image data 800c, for example, or may have a radius determined by the number of selectable target icons 640 in target selection dialog 738, where the radius is selected to be large enough to allow target selection area indicator 742 to overlay all selectable target icons 640 in target selection dialog 738. For example, a radius of target selection area indicator 742 may be set substantially equal to the largest range from the center of target selection area indicator 742 to each of the selectable target icons 640. In some embodiments, target selection area indicator 742 may include characteristics and/or functionality of zoom window 642 described in reference to image data 600b of FIG. 6B.

Embodiments of the present disclosure can thus provide navigational information rendered in a highly intuitive form that can be easily and quickly organized and comprehended by a user or pilot of a mobile structure. Such embodiments may provide image data to assist in navigation of a mobile structure, survey of a body of water, and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a user interface for a mobile structure, wherein the user interface comprises a display;
a controller configured to communicate with the user interface for the mobile structure, wherein the controller is configured to:
render a target icon and a reference icon on the display of the user interface, wherein the reference icon is associated with the mobile structure and is rendered substantially statically relative to the display over a first plurality of display updates;
receive user selection of the target icon from the user interface; and
render a target dialog on the display, wherein the target dialog is rendered substantially statically relative to the selected target icon over a second plurality of display updates, wherein the reference icon is rendered to remain substantially static relative to the display over the second plurality of display updates.

2. The system of claim 1, further comprising a speed, position, and/or orientation sensor (SPOS) coupled to the mobile structure, wherein the controller is configured to:
receive a series of speeds, positions, and/or orientations of the mobile structure from the SPOS and one or more positions of a target, corresponding to the target icon, from a target database and/or a ranging sensor configured to communicate with the controller; and
render the target icon to indicate positions of the target relative to positions and/or orientations of the mobile structure.

3. The system of claim 2, further comprising:
the ranging sensor configured to communicate with the controller.

4. The system of claim 1, wherein the controller is configured to:
render a screen cursor on the display prior to the receiving the user selection of the target icon; and
render a target cursor on the display after the receiving the user selection of the target icon, wherein the target cursor is configured to indicate the selected target icon and/or at least partially graphically link the target dialog to the target icon.

5. The system of claim 1, wherein the controller is configured to:
determine, based at least in part on a series of positions and/or orientations of the mobile structure and/or one or more positions of a target, corresponding to the target icon, that a position of the target relative to a position and/or orientation of the mobile structure is too large to render on the display; and
remove the target icon and the target dialog from the display.

6. The system of claim 5, wherein the controller is configured to:
render a screen cursor in place of the removed target icon and/or dialog.

7. The system of claim 1, wherein the controller is configured to:
receive user selection of the target dialog; and
render a target menu on the display, wherein the target icon and the target menu are rendered substantially statically relative to the display until the target menu is dismissed by user selection.

8. The system of claim 1, wherein the receive user selection of the target icon comprises:
receiving user selection indicating a portion of the display and determining that the indicated portion intersects and/or adjoins the target icon.

9. The system of claim 8, wherein the determining that the indicated portion intersects or adjoins the target icon comprises:
rendering a screen cursor at the indicated portion and determining that an area of the display, corresponding to a shape of the screen cursor, intersects and/or adjoins the target icon;
rendering a target selection dialog comprising a list of a plurality of selectable target icons intersected and/or adjoined by the area, and receiving user selection of the target icon in the target selection dialog; and/or
rendering a zoom window configured to provide increased spatial detail at the indicated portion, displaying each of the plurality of selectable target icons intersected and/or adjoined by the area, and receiving a user drag at the display to substantially align the target icon with the indicated portion.

10. The system of claim 1, wherein the receive user selection of the target icon comprises:
receiving user selection indicating a portion of the display and determining that the indicated portion does not intersect or adjoin the target icon;

rendering the target dialog on the display, wherein the target dialog is rendered substantially statically relative to the indicated portion;

receiving a user drag at the display; and repositioning the target icon according to the received drag to substantially align the target icon with the indicated portion and determining that the indicated portion intersects or adjoins the target icon.

11. A method comprising:

rendering a target icon and a reference icon on a display of a user interface for a mobile structure, wherein the reference icon is associated with the mobile structure and is rendered substantially statically relative to the display over a first plurality of display updates;

receiving user selection of the target icon from the user interface; and rendering a target dialog on the display, wherein the target dialog is rendered substantially statically relative to the selected target icon over a second plurality of display updates, and wherein the reference icon is rendered to remain substantially static relative to the display over the second plurality of display updates.

12. The method of claim 11, further comprising:

receiving a series of speeds, positions, and/or orientations of the mobile structure from a speed, position, and/or orientation sensor (SPOS) coupled to the mobile structure and one or more positions of a target, corresponding to the target icon, from a target database and/or a ranging sensor; and rendering the target icon to indicate positions of the target relative to positions and/or orientations of the mobile structure.

13. The method of claim 12, further comprising rendering marine chart data on the display, wherein:

the display is configured to indicate a position and/or orientation of the mobile structure relative to the marine chart data; and the mobile structure comprises a watercraft.

14. The method of claim 11, further comprising:

rendering a screen cursor on the display prior to the receiving the user selection of the target icon; and rendering a target cursor on the display after the receiving the user selection of the target icon, wherein the target cursor is configured to indicate the selected target icon and/or at least partially graphically link the target dialog to the target icon.

15. The method of claim 11, further comprising:

determining, based at least in part on a series of positions and/or orientations of the mobile structure and/or one or more positions of a target, corresponding to the target icon, that a position of the target relative to a position and/or orientation of the mobile structure is too large to render on the display; and removing the target icon and the target dialog from the display.

16. The method of claim 15, further comprising:

rendering a screen cursor in place of the removed target icon and/or dialog, wherein the screen cursor is rendered substantially statically relative to the display.

17. The method of claim 11, further comprising:

receiving user selection of the target dialog;

rendering a target menu on the display, wherein the target icon and the target menu are rendered substantially statically relative to the display until the target menu is dismissed by user selection.

18. The method of claim 11, wherein the receiving the user selection of the target icon comprises:

receiving user selection indicating a portion of the display and determining that the indicated portion intersects and/or adjoins the target icon.

19. The method of claim 18, wherein the determining that the indicated portion intersects or adjoins the target icon comprises:

rendering a screen cursor at the indicated portion and determining that an area of the display, corresponding to a shape of the screen cursor, intersects and/or adjoins the target icon;

rendering a target selection dialog comprising a list of a plurality of selectable target icons intersected and/or adjoined by the area, and receiving user selection of the target icon in the target selection dialog; and/or rendering a zoom window configured to provide increased spatial detail at the indicated portion, displaying each of the plurality of selectable target icons intersected and/or adjoined by the area, and receiving a user drag at the display to substantially align the target icon with the indicated portion.

20. The method of claim 11, wherein the receiving the user selection of the target icon comprises:

receiving user selection indicating a portion of the display and determining that the indicated portion does not intersect or adjoin the target icon;

rendering the target dialog on the display, wherein the target dialog is rendered substantially statically relative to the indicated portion;

receiving a user drag at the display; and repositioning the target icon according to the received drag to substantially align the target icon with the indicated portion and determining that the indicated portion intersects or adjoins the target icon.

* * * * *